US006636967B1

(12) United States Patent
Koyano

(10) Patent No.: US 6,636,967 B1
(45) Date of Patent: Oct. 21, 2003

(54) ELECTRONIC-WATERMARK CONTROL APPARATUS AND METHOD, INFORMATION CONTROL APPARATUS AND METHOD, AND STORAGE MEDIUM CAPABLE OF BEING READ BY A COMPUTER

(75) Inventor: Hiroki Koyano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/435,776

(22) Filed: Nov. 8, 1999

(30) Foreign Application Priority Data

Nov. 13, 1998 (JP) .......................................... 10-324119

(51) Int. Cl.$^7$ ................................................. G06F 1/24
(52) U.S. Cl. ...................................................... 713/176
(58) Field of Search ................................ 713/176, 177, 713/155, 180, 179; 705/54, 75, 76, 57, 58; 380/201, 202, 203; 382/100, 296

(56) References Cited

U.S. PATENT DOCUMENTS

| | | | | |
|---|---|---|---|---|
| 5,506,795 A | * | 4/1996 | Yamakawa | 380/46 |
| 5,889,868 A | * | 3/1999 | Moskowitz et al. | 713/176 |
| 6,061,793 A | * | 5/2000 | Tewfik et al. | 713/176 |
| 6,252,971 B1 | * | 6/2001 | Wang | 382/100 |

* cited by examiner

*Primary Examiner*—John W. Hayes
*Assistant Examiner*—Pierre E. Elisca
(74) *Attorney, Agent, or Firm*—Fitzpatrick, Cella, Harper & Scinto

(57) ABSTRACT

An information control apparatus includes a superposition circuit for superposing a plurality of elements, each having electronic-watermark information, to provide a set of data, a determination circuit for determining, prior to superposition, a state of respective sets of electronic-watermark information after the superposition, and a notification circuit for notifying of the determined state.

9 Claims, 8 Drawing Sheets

FIG.7

| SYNTHESIS OF ELECTRONIC TRANSPARENCIES | ☒ |
|---|---|
| THERE IS AN OVERLAP BETWEEN REGIONS OF ELECTRONIC TRANSPARENCIES.<br><br>IS SYNTHESIS OF ELECTRONIC TRANSPARENCIES TO BE PERFORMED? | YES<br><br>NO |

FIG.8

| METHOD FOR UPDATING THE CURRENT ELECTRONIC TRANSPARENCY | ☒ |
|---|---|
| PLEASE ASSIGN THE METHOD FOR UPDATING THE CURRENT ELECTRONIC TRANSPARENCY.<br><br>⊙ AUTOMATICALLY UPDATE THE ELECTRONIC TRANSPARENCY.<br>○ NEWLY SET AN ELECTRONIC TRANSPARENCY.<br>○ NOT UPDATE THE ELECTRONIC TRANSPARENCY. | OK |

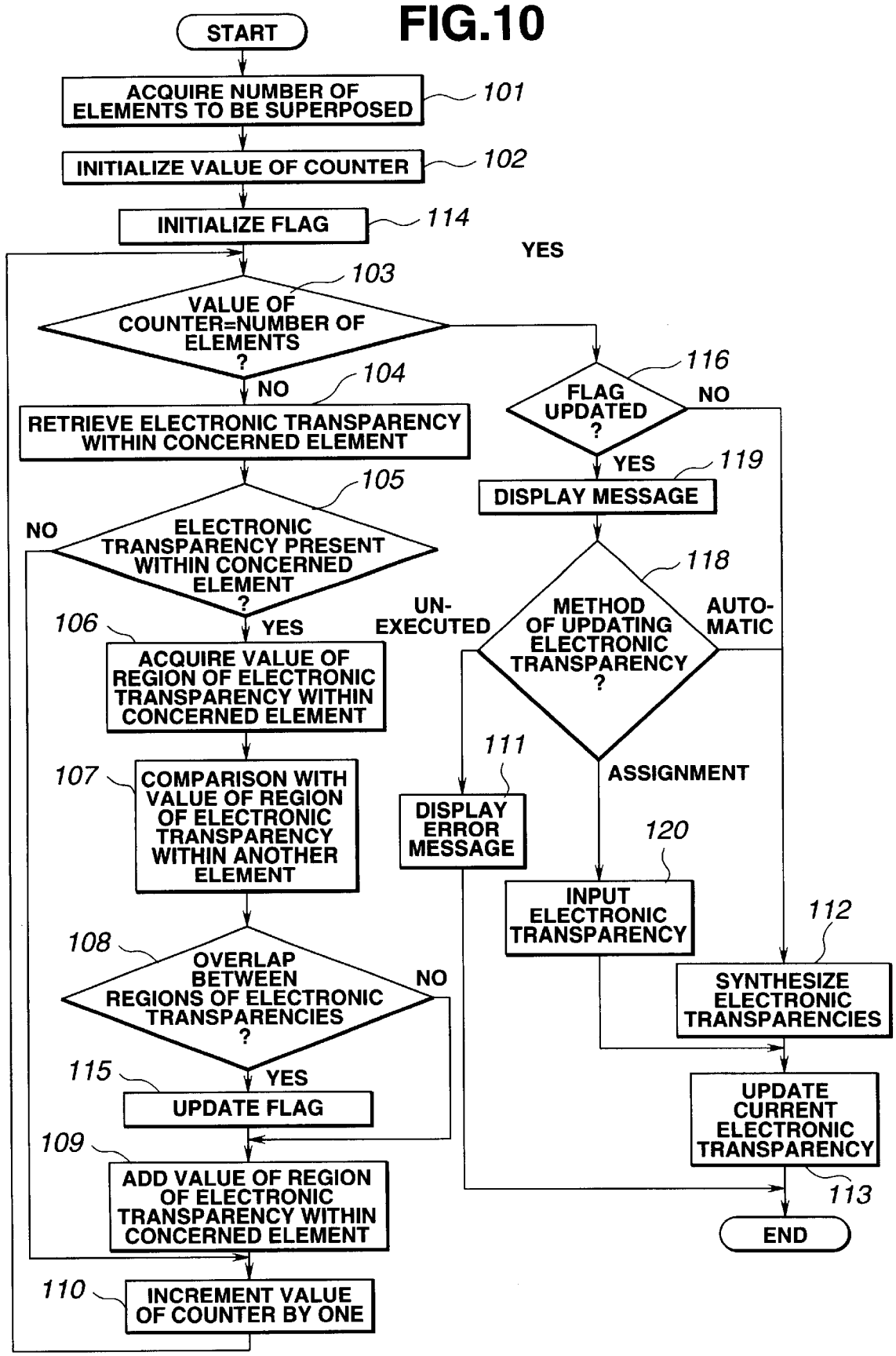

ELECTRONIC-WATERMARK CONTROL APPARATUS AND METHOD, INFORMATION CONTROL APPARATUS AND METHOD, AND STORAGE MEDIUM CAPABLE OF BEING READ BY A COMPUTER

BACKGROUND OF THE INVENTION

1. Field of the Invention

The present invention relates to an electronic-watermark control apparatus and method for controlling electronic-watermark information used in image data, an information control apparatus and method, and a storage medium, capable of being read by a computer, used for these apparatuses and methods.

2. Description of the Related Art

There have been approaches for protecting the copyright of an image or guaranteeing authenticity of the image by embedding electronic-watermark information in the image as information which is difficult to been seen.

The state of electronic watermarks after being superposed, when a plurality of elements include respective electronic watermarks and a set of data is obtained by superposing these elements, for example, when superposing a plurality of files having respective electronic watermarks has not been clearly studied. Accordingly, when a plurality of electronic watermarks are present in the same region within data after being superposed, an overlapped state between the electronic watermarks is provided, thereby causing problems such that, for example, a state of an electronic watermark after superposition which is different from the state intended by the user is provided, the effectiveness of the electronic watermark is impaired, and electronic-watermark information is destructed.

SUMMARY OF THE INVENTION

The present invention has been made in consideration of the above-described problems.

According to one aspect of the present invention, an information control apparatus includes superposition means for superposing a plurality of elements, each having a set of electronic-watermark information, to provide a set of data, determination means for determining a state of respective sets of electronic-watermark information after the superposition, and notification means for notifying of the determined states.

According to another aspect of the present invention, an information control method includes the steps of superposing a plurality of elements, each having a set of electronic-watermark information, to provide a set of data, determining a state of respective sets of electronic-watermark information after the superposition, and notifying the determined states.

According to still another aspect of the present invention, in a computer readable memory storing a program, the program includes the steps of superposing a plurality of elements, each having a set of electronic-watermark information, to provide a set of data, determining a state of respective sets of electronic-watermark information after the superposition, and notifying of the determined states.

According to yet another aspect of the present invention, an information control apparatus includes synthesis means for synthesizing a plurality of sets of electronic-watermark information, determination means for determining a position of each of the plurality of sets of electronic-watermark information, and control means for controlling the synthesis means so that positions of synthesis of the respective sets of electronic-watermark information do not overlap, based on a result of the determination of the determination means.

According to yet a further aspect of the present invention, an information control apparatus includes synthesis means for synthesizing a plurality of sets of information to provide a single set of information, determination means for determining a position of specific information in each of the plurality of sets of information, and control means for controlling the synthesis means so that positions of synthesis of respective sets of specific information do not overlap, based on a result of the determination of the determination means.

According to still another aspect of the present invention, an information control method includes the steps of determining respective positions of a plurality of sets of electronic-watermark information, and synthesizing the plurality of sets of electronic-watermark information so that they do not overlap with one another based on a result of the determination.

According to still another aspect of the present invention, an information control method includes the steps of determining a position of specific information in each of a plurality of sets of information, and synthesizing the plurality of sets of information so that positions of synthesis of respective sets of specific information do not overlap, based on a result of the determination, to provide a single set of information.

According to still another aspect of the present invention, in a computer readable memory storing a program, the program includes the steps of determining respective positions of a plurality of sets of electronic-watermark information, and synthesizing the plurality of sets of electronic-watermark information so that they do not overlap with one another, based on a result of the determination.

According to still another aspect of the present invention, in a computer readable memory storing a program, the program includes the steps of determining a position of specific sets of information in each of a plurality of sets of information, and synthesizing the plurality of sets of information so that positions of synthesis of respective sets of specific information do not overlap, based on a result of the determination, to provide a single set of information.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 4 is a diagram illustrating the configuration of a storage medium storing programs and the like;

FIG. 7 is a diagram illustrating an example of a display for setting whether or not synthesis of electronic watermarks is to be performed;

FIG. 8 is a diagram illustrating an example of a display for setting a method for updating an electronic watermark;

FIG. 10 is a flowchart illustrating: a method for controlling electronic-watermark information according to a third embodiment of the present invention.

DETAILED DESCRIPTION OF THE PREFERRED EMBODIMENTS

Preferred embodiments of the present invention will now be described with reference to the drawings.

Figure 1:
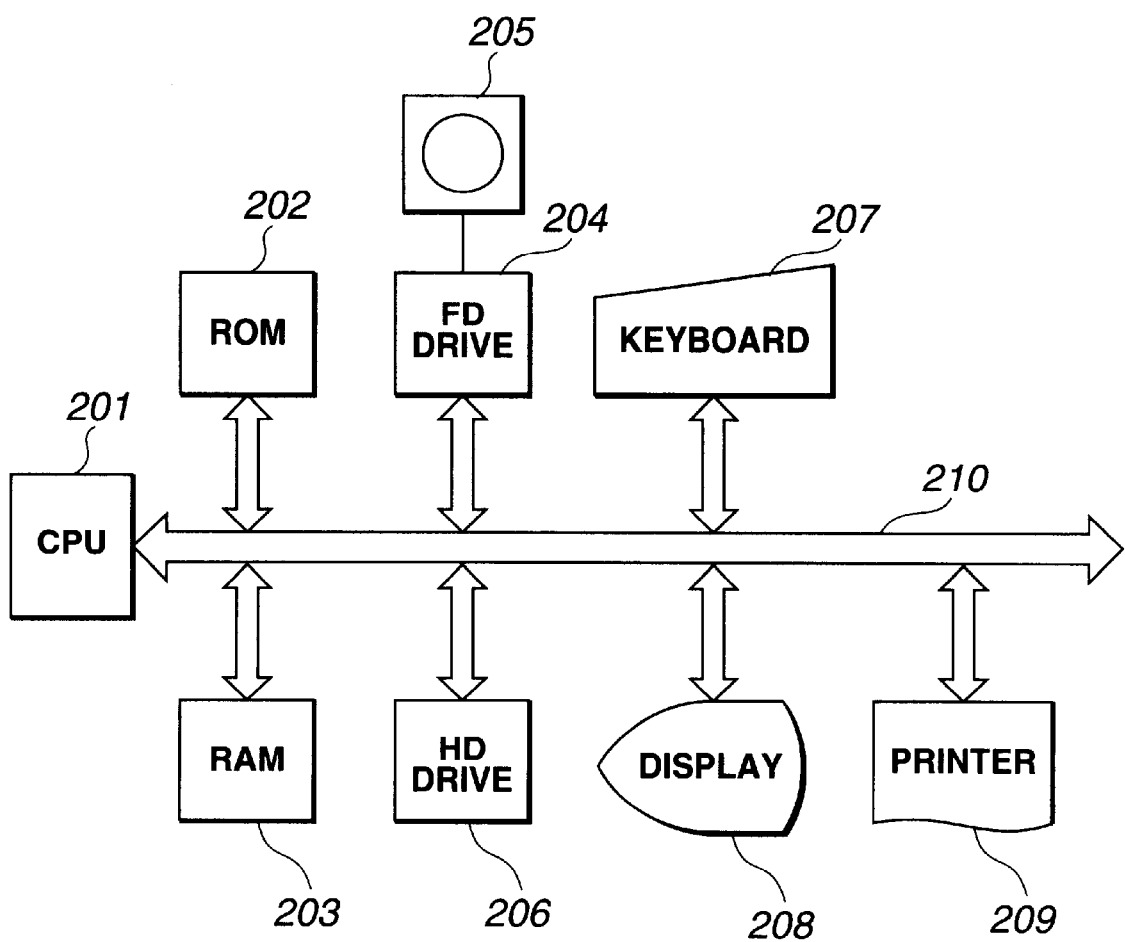
FIG. 1 is a block diagram illustrating an apparatus for controlling electronic-watermark information according to the present invention.
Figure 2:
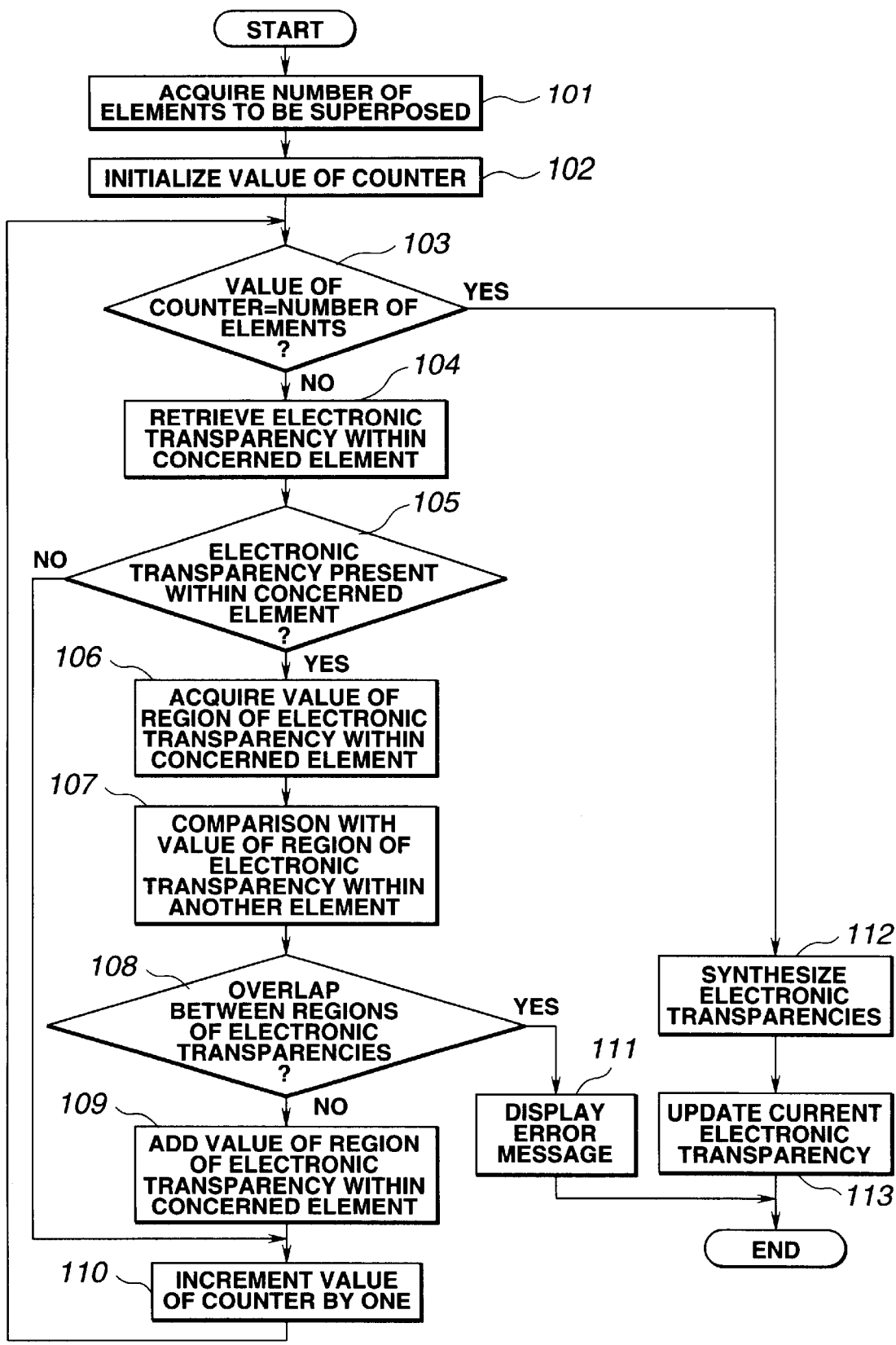
FIG. 2 is a flowchart illustrating a method for controlling electronic-watermark information according to a first embodiment of the present invention.

FIG. 1 is a block diagram illustrating an electronic-watermark information control apparatus according to the present invention. FIG. 2 is a flowchart illustrating an electronic-watermark information control method according to a first embodiment of the present invention.

In FIG. 1, the control apparatus is operated by execution of a basic I/O (input/output) program (301 in FIG. 3) an OS (operating system) (302 in FIG. 3) and an electronic-watermark control program (303 in FIG. 3) by a CPU (central processing unit) 201. The CPU 201 is connected to other components by a bus 210. The memory map 300 in FIG. 3 further includes a data area 304 and a working area 305. The basic I/O program is written in a ROM (read-only memory) 202, and the OS is written in an HD (hard disk) drive 206. When the power supply of the control apparatus is turned on, the OS is read from the HD drive 206 into a RAM (random access memory) 203 according to an IDL (initial program loading) function in the basic I/O program, and the operation of the OS is started. A printer 209 may also be connected to the apparatus.

Figure 4:
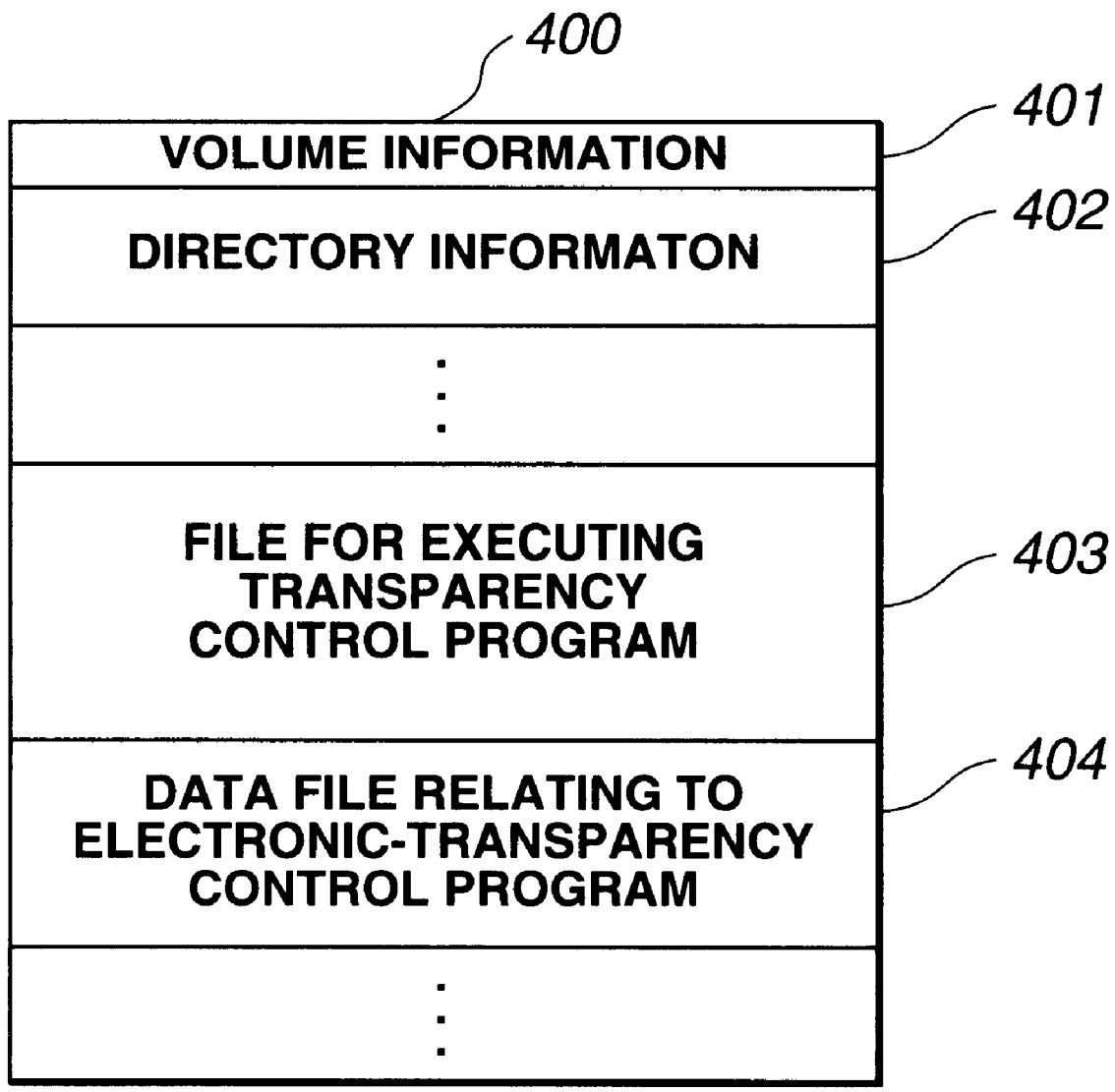

The electronic-watermark control program is obtained by being subjected to program encoding based on the flowchart shown in FIG. 2. In the first embodiment, the control program and related data are recorded on an FD (floppy disk) 205. FIG. 4 illustrates the contents of recording on the FD 205.

In FIG. 4, reference numeral 400 represents a storage medium, such as the FD 205 or the like. The storage medium 400 stores volume information 401, directory information 402, a file 403 for executing the control program, and a data file 404 relating to the control program.

Figure 5:
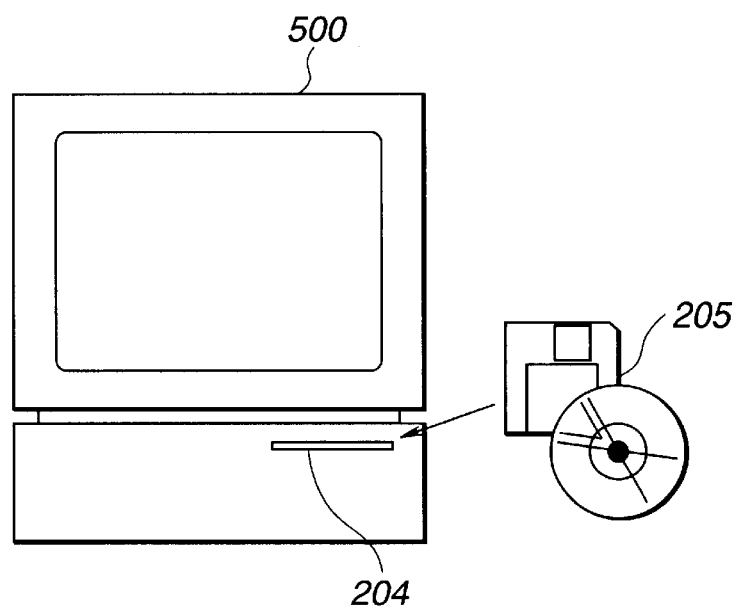
FIG. 5 is a diagram illustrating a state in which a program or the like is supplied from a storage medium to a computer system.

As shown in FIG. 5, the electronic-watermark control program and the related data recorded on the FD 205 can be loaded into a computer system 500 via an FD drive 204. When the FD 205 is set in the FD drive 204, the control program and the related data are read from the FD 205 under the control of the OS and the basic I/O program, and are loaded into the RAM 203 to become operable.

Figure 3:
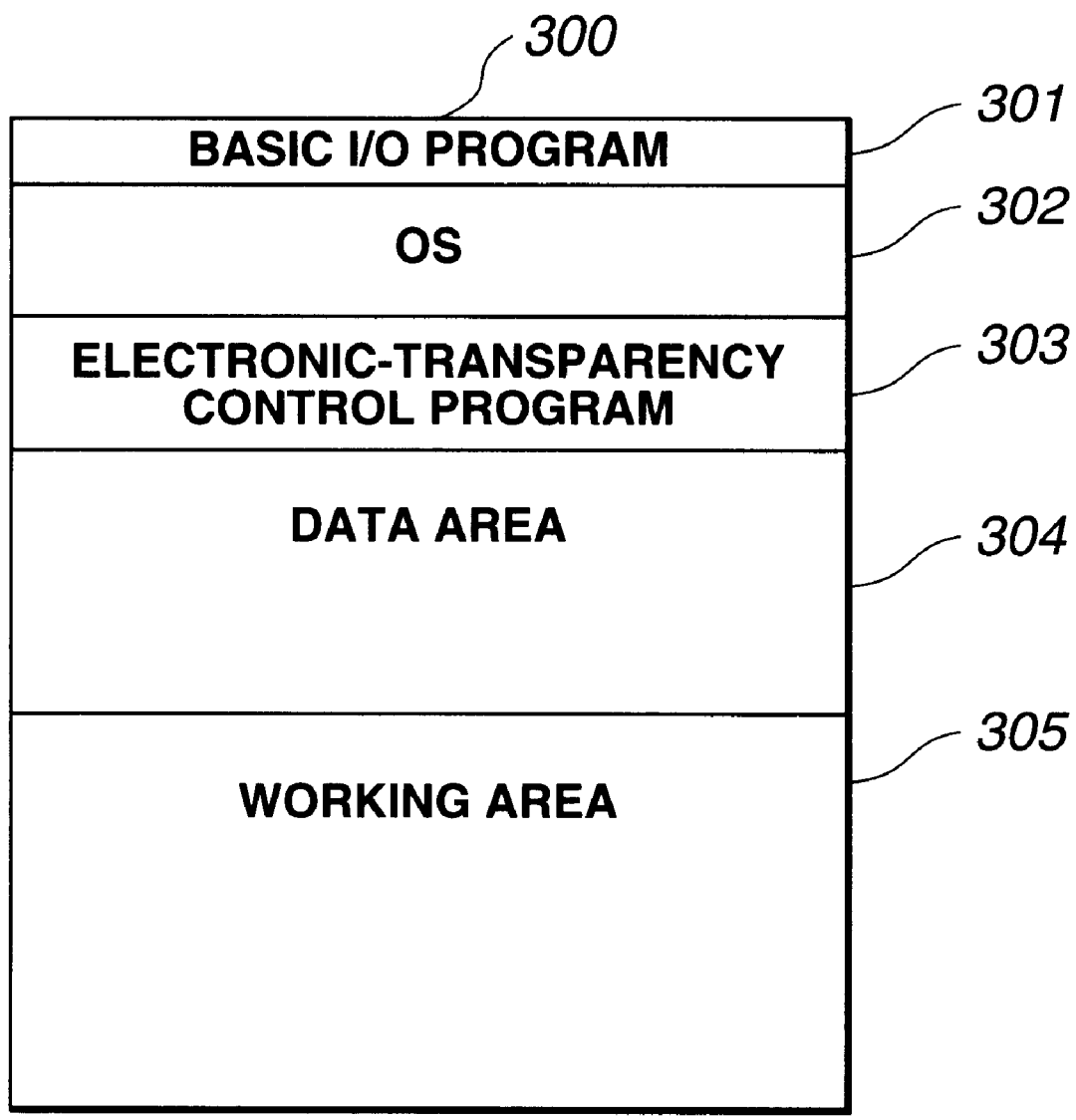
FIG. 3 is a diagram illustrating the configuration of a memory map when a program for controlling electronic-watermark information operates.

FIG. 3. illustrates a memory map in a state in which the control program is loaded into the RAM 203 to become operable.

Although in the first embodiment, a case of loading the control program and the related data directly from the FD 205 into the RAM 203 for execution has been described, the control program and the related data may be first stored (installed) from the HD 205 into the HD drive 206, and may then be loaded from the HD drive 206 into the RAM 203 when operating the control program.

A CD(compact disc)-ROM, an IC (integrated circuit) memory card, a magnetic medium or the like may also be used as the storage medium for storing the electronic-watermark control program instead of the FD 205 or the HD drive 206.

Alternatively, the control program may be stored in the ROM 202 as a part of the memory map 300 in FIG. 3, and may be executed directly by the CPU 201.

Each of the above-described storage media constitutes a storage medium capable of being read by a computer according to the present invention.

Next, the operation of the first embodiment will be described with reference to FIG. 2.

When the user has initialized an operation of superposing a plurality of elements to provide a single element, the number of elements to be superposed is acquired (step 101). Then, in step 102, the value of a counter for repeating processing is initialized. Then, in step 103, it is determined if the value of the counter set in step 102 equals the number of elements acquired in step 101.

If the result of the determination in step 103 is negative, processing from step 104 to step 110 is performed.

First, in order to determine if an electronic watermark is present within a particular element, an attempt is made to retrieve an electronic watermark from within the particular element (step 104). After executing the processing of retrieving an electronic watermark, it is determined if an electronic watermark is present within the particular element (step 105).

If the result of the determination in step 105 is negative, the process proceeds to step 110, where the value of the counter is incremented by one, and the process returns to the leading step 103 for repeating the processing.

If the result of the determination in step 105 is affirmative, the process proceeds to step 106, where the region where an electronic watermark is present is acquired from the particular element as a value. After performing processing of comparing the acquired value of the region from the particular element with the value of a region where an electronic watermark is present within each of the other elements of the plurality of elements in a data area 304 in the memory shown in FIG. 3 (step 107), it is determined if there is an overlap between regions of electronic watermarks (step 108).

If the result of the determination in step 108 is negative, after adding the value of the region acquired in step 106 to the data area 304 of the memory (step 109), the value of the counter is incremented by one (step 110). Then, the process returns to the leading step 103 for repeating the processing.

If the result of the determination in step 108 is affirmative, then, after notifying of an error by displaying a message (on display 208 in FIG. 1) indicating that synthesis/updating of electronic watermarks according to an operation of superposing data to provide single data cannot be performed (step 111), the process is terminated.

Figure 6:
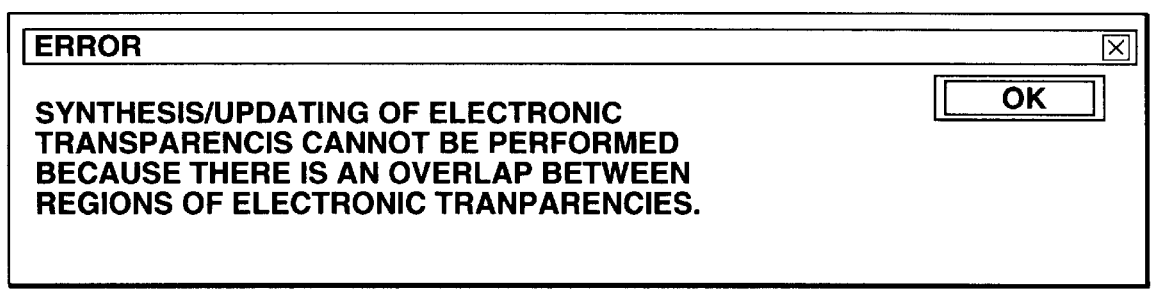
FIG. 6 is a diagram illustrating an example of a display indicating that synthesis/updating of electronic watermarks cannot be performed.

FIG. 6 illustrates an example of a display of an error message for notifying of incapability of synthesis/updating of electronic watermarks.

By interrupting synthesis/updating of electronic watermarks using this display, the original electronic-watermark information can be preserved.

If the result of the determination in step 103 is affirmative, then, after performing processing of synthesizing the electronic watermarks (step 112), and processing of updating the current electronic watermark (step 113), the process is terminated.

Figure 9:
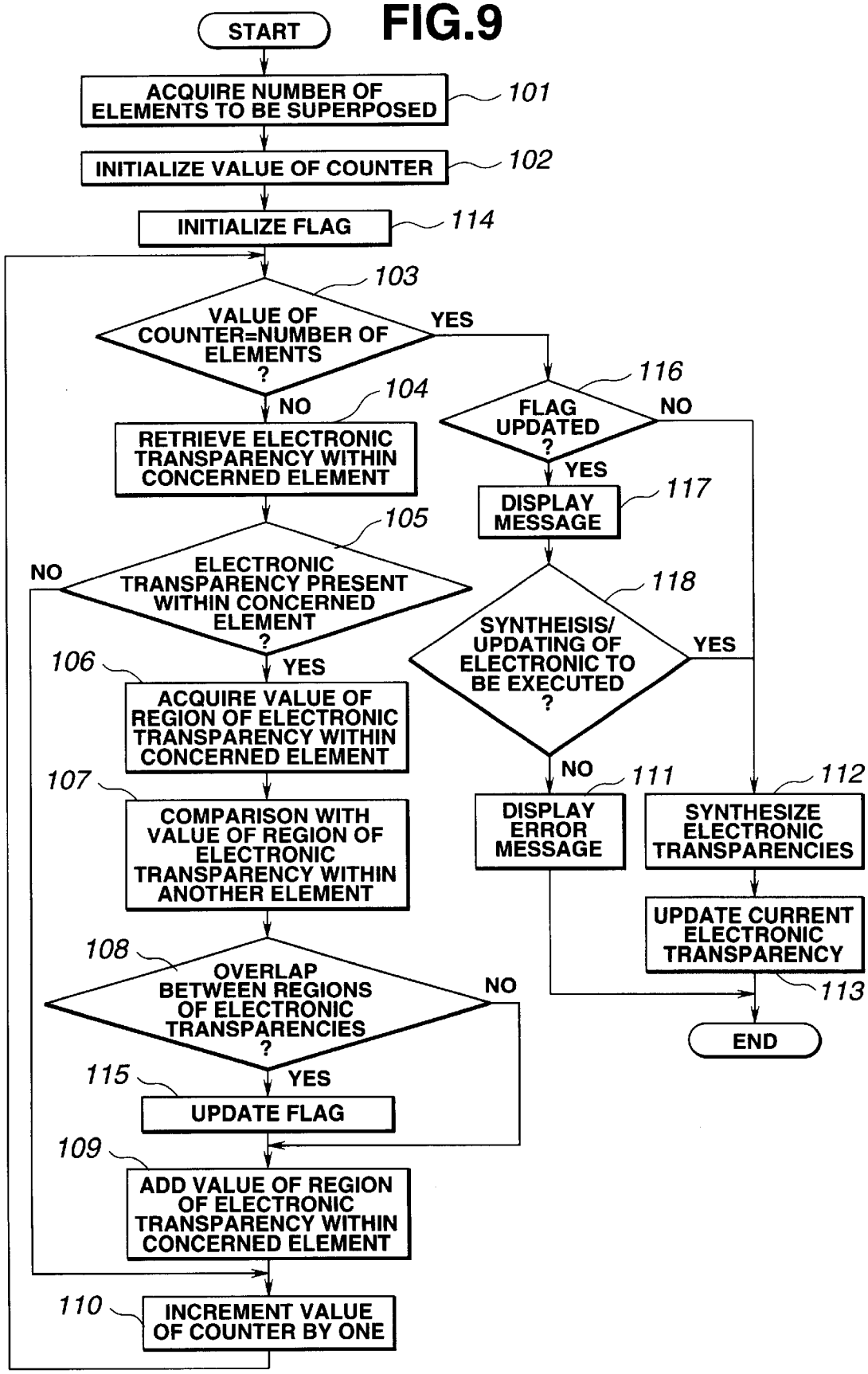
FIG. 9 is a flowchart illustrating a method for controlling electronic-watermark information according to a second embodiment of the present invention.

FIG. 9 is a flowchart illustrating the operation of an electronic-watermark control method according to a second embodiment of the present invention.

The processing of the second embodiment shown in FIG. 9 differs from the processing of the first embodiment shown in FIG. 2 in that step 114 is added after step 102, step 115 is added after step 108, and steps 116, 117 and 118 are added after step 103.

First, a flag for determining if there is an overlap between the regions of respective electronic watermarks within a plurality of elements in the data is prepared, and is initialized when starting the processing (step 114). The flag is updated when the result of the determination in step 108 is affirmative (step 115). If the result of the determination in step 103 is affirmative, it is then determined if the flag has been updated (step 116).

If the result of the determination in step 116 is affirmative, a message for setting if synthesis of electronic watermarks is to be performed is displayed (step 117). FIG. 7 illustrates an example of display of such a message.

Then, it is determined if synthesis/updating of electronic watermarks is to be executed (step 118). If the result of the determination in step 118 is affirmative, processing of synthesizing electronic watermarks (step 112), and processing of updating the current electronic watermark (step 113) are performed.

In the above-described first embodiment, if there is an overlap between regions of respective electronic watermarks within a plurality of elements in data when superposing data to provide single data, it is impossible to synthesize electronic watermarks and update the current electronic watermark. According to the second embodiment, however, it is possible to synthesize/update electronic watermarks whose regions in a plurality of corresponding elements overlap, and to maintain effectiveness of superposed electronic watermarks.

FIG. 10 is a flowchart illustrating the operation of a third embodiment of the present invention. In the flowchart, shown in FIG. 10, step 120 is added after step 118 shown in FIG. 9.

In the above-described second embodiment, if there is an overlap between regions of electronic watermarks within a plurality of corresponding elements in data when superposing the data to provide single data, the processing of synthesizing and updating electronic watermarks is automatically performed. In the third embodiment, however, this processing is performed in the following manner.

In FIG. 10, when it is determined that the flag has been updated in step 116, a message for setting a method for updating the electronic watermark is displayed (step 119). FIG. 8 illustrates an example of such display.

When it is determined in step 118 that the updating method set in step 119 indicates assignment of a new electronic watermark, by setting an electronic watermark through an input device (for example, the keyboard 207 in FIG. 1) (step 120), the contents of the setting are used as the updated electronic watermark (step 113).

According to the third embodiment, the load of complicated processing of synthesizing electronic watermarks after superposing data is reduced, thereby allowing efficient processing.

A description will now be provided of a storage medium according to still another embodiment of the present invention.

When constituting the present invention by a computer system comprising the CPU 201 and a memory, such as the ROM 202 or the like, shown in FIG. 1, the memory operates as the storage medium according to the present invention.

That is, the object of the present invention may be achieved by using a storage medium storing program codes of software for executing the operations according to the flowcharts shown in FIGS. 2, 9 and 10 in a system or an apparatus, and reading and executing the program codes stored in the storage medium by a CPU of the system or the apparatus.

A semiconductor memory, such as a ROM, a RAM or the like, an optical disk, a magnetooptical disk, a CD-ROM, a floppy disk, a magnetic medium, a magnetic card, a non-volatile memory card or the like, may be used as the storage medium.

Accordingly, it is possible to obtain functions and effects equivalent to those of the above-described embodiments, and to achieve the object of the present invention by using such a storage medium in a system or an apparatus other than the system or the apparatus shown in FIG. 1, and reading and executing program codes stored in the storage medium by the system or a computer.

Functions and effects equivalent to those of the above-described embodiments may also be realized, and the object of the present invention may also be realized, when an OS or the like operating in a computer performs a part or the entirety of processing, or when, after writing program codes read from a storage medium into a memory provided in a function expanding board inserted into a computer or in a function expanding unit connected to the computer, a CPU or the like provided in the function expanding board or the function expanding unit performs a part or the entirety of processing based on instructions of the program codes.

As described above, according to the above-described embodiments, effectiveness of an electronic watermark can be maintained even when a plurality of elements, each having electronic-watermark information, are superposed to provide single data, or when there is an overlap between regions of electronic watermarks within a plurality of corresponding elements within data.

It is also possible to perform synthesis/updating of electronic watermarks which do not overlap with each other, and to maintain effectiveness of superposed electronic watermarks.

The individual components shown in outline or designated by blocks in the drawings are all well known in the electronic-watermark control apparatus and method, information control apparatus and method, and storage medium arts and their specific construction and operation are not critical to the operation or the best mode for carrying out the invention.

While the present invention has been described with respect to what are presently considered to be the preferred embodiments, it is to be understood that the invention is not limited to the disclosed embodiments To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information control apparatus comprising:

superposition means for superposing a plurality of data elements to provide a set of data, each data element of the plurality of data elements being superposed including electronic-watermark information;

determination means for determining a region where electronic-watermark information is present within a data element;

comparison means for comparing a region where electronic-watermark information is present within one of the plurality of data elements with a region where electronic-watermark information is present within another of the plurality of data elements and determining if there is an overlap between the compared regions; and notification means for outputting a notifying message based on the results of the comparison.

2. An apparatus according to claim 1, further comprising:

update means for updating electronic-watermark information, wherein said superposition means superposes a plurality of data elements to provide a set of data where at least one data element includes updated electronic-watermark information.

3. An apparatus according to claim 2, further comprising:

input means for inputting new electronic-watermark information, wherein said update means uses the new electronic-watermark information input by said input means to update electronic-watermark information included in at least one data element.

4. An apparatus according to claim 1, wherein said notification means outputs the notifying message to a display.

5. An information control method comprising the steps of:

superposing a plurality of data elements to provide a set of data, each data element of the plurality of data elements being superposed including electronic-watermark information;

determining a region where electronic-watermark information is present within a data element;

comparing a region where electronic-watermark information is present within one of the plurality of data elements with a region where electronic-watermark information is present within another of the plurality of data elements and determining if there is an overlap between compared regions; and outputting a notifying message based on the results of the comparison.

6. A computer readable memory storing a program, said program comprising the steps of:

superposing a plurality of data elements to provide a set of data, each data element of the plurality of data elements being superposed including electronic-watermark information;

determining a region where electronic-watermark information is present within a data element;

comparing a region where electronic-watermark information is present within one of the plurality of data elements with a region where electronic-watermark information is present within another of the plurality of data elements and determining if there is an overlap between compared regions; and outputting a notifying message based on the results of the comparison.

7. An information control apparatus comprising:

superposition means for superposing a plurality of data elements to provide a set of data, each data element of the plurality of data elements being superposed including electronic-watermark information;

determination means for determining a region where electronic-watermark information is present within a data element;

comparison means for comparing a region where electronic-watermark information is present within one of the plurality of data elements with a region where electronic-watermark information is present within another of the plurality of data elements and determining if there is an overlap between compared regions; and terminator means for terminating the process of superposing by said superposition means based on the result of the comparison.

8. An information control method comprising the steps of:

superposing a plurality of data elements to provide a set of data, each data element of the plurality of data elements being superposed including electronic-watermark information;

determining a region where electronic-watermark information is present within a data element;

comparing a region where electronic-watermark information is present within one of the plurality of data elements with a region where electronic-watermark information is present within another of the plurality of data elements and determining if there is an overlap between compared regions; and terminating the process of superposing in said superposing step based on the result of the comparison.

9. A computer readable memory storing a program, said program comprising the steps of:

superposing a plurality of data elements to provide a set of data, each data element of the plurality of data elements being superposed including electronic-watermark information;

determining a region where electronic-watermark information is present within a data element;

comparing a region where electronic-watermark information is present within one of the plurality of data elements with a region where electronic-watermark information is present within another of the plurality of data elements and determining if there is an overlap between compared regions; and terminating the process of superposing in said superposing step based on the result of the comparison.

* * * * *

UNITED STATES PATENT AND TRADEMARK OFFICE
CERTIFICATE OF CORRECTION

PATENT NO.     : 6,636,967 B1                                                              Page 1 of 1
DATED          : October 21, 2003
INVENTOR(S)    : Koyano It is certified that error appears in the above-identified patent and that said Letters Patent is hereby corrected as shown below:

<u>Column 1</u>,
Line 54, "the" should read -- of the --.

<u>Column 3</u>,
Line 9, "illustrating:" should read -- illustrating --; and
Line 63, "HD 205" should read -- FD 205 --.

Signed and Sealed this

Eighteenth Day of May, 2004

JON W. DUDAS
*Acting Director of the United States Patent and Trademark Office*